(12) United States Patent
Anderson et al.

(10) Patent No.: US 9,272,233 B2
(45) Date of Patent: Mar. 1, 2016

(54) NANO-FILTER AND METHOD OF FORMING SAME, AND METHOD OF FILTRATION

(71) Applicant: International Business Machines Corporation, Armonk, NY (US)

(72) Inventors: Brent A. Anderson, Jericho, VT (US); Andres Bryant, Burlington, VT (US); Edward J. Nowak, Essex, VT (US); Jeffrey W. Sleight, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 14/084,139

(22) Filed: Nov. 19, 2013

(65) Prior Publication Data
US 2014/0061139 A1  Mar. 6, 2014

Related U.S. Application Data

(62) Division of application No. 12/966,370, filed on Dec. 13, 2010, now Pat. No. 8,617,412.

(51) Int. Cl.
| | | |
|---|---|---|
| *B01D 61/00* | (2006.01) | |
| *B01D 63/00* | (2006.01) | |
| *C02F 1/44* | (2006.01) | |
| *B01D 39/00* | (2006.01) | |
| *B01D 39/14* | (2006.01) | |
| *B01D 39/20* | (2006.01) | |
| *B82Y 30/00* | (2011.01) | |

(52) U.S. Cl.
CPC ............ *B01D 39/2082* (2013.01); *B82Y 30/00* (2013.01); *B01D 2239/025* (2013.01); *B01D 2239/0613* (2013.01); *B01D 2239/10* (2013.01); *B01D 2239/1233* (2013.01)

(58) Field of Classification Search
CPC .. B82Y 30/00; B82Y 40/00; B01D 2239/025; B01D 2239/0613; B01D 2239/10; B01D 2239/1233; B01D 39/2082; B01J 19/0093; B22F 1/0025; B81B 2201/0292; B81B 2203/0338; Y10S 977/762; C40B 60/12; G01N 33/48728; H01L 27/1292; H01L 29/0673; H01M 2008/1095; H01M 8/0234; H01M 8/0289; Y02E 60/521
See application file for complete search history.

(56) References Cited

U.S. PATENT DOCUMENTS

| | | | |
|---|---|---|---|
| 723,286 A | 3/1903 | Lawler | |
| 5,994,696 A | 11/1999 | Tai et al. | |
| 6,251,271 B1 * | 6/2001 | Hagqvist | B01D 65/08 210/195.2 |
| 6,478,974 B1 | 11/2002 | Lebouitz et al. | |
| 7,230,286 B2 | 6/2007 | Cohen et al. | |
| 7,232,286 B2 * | 6/2007 | Shinozaki | F16J 15/406 118/719 |
| 7,891,772 B2 * | 2/2011 | Silverbrook | C09B 47/085 347/20 |
| 8,617,412 B2 * | 12/2013 | Anderson | B82Y 30/00 210/488 |

(Continued)

OTHER PUBLICATIONS

Fortuna, U.S. Appl. No. 12/966,370, USPTO Office Action Communication, Jul. 3, 2013, 10 pages.

(Continued)

*Primary Examiner* — Ana Fortuna
(74) *Attorney, Agent, or Firm* — Steven J. Meyers; Hoffman Warnick LLC

(57) ABSTRACT

The disclosure relates generally to nano-filters and methods of forming same, and methods of filtration. The nano-filter includes a substrate and at least one nanowire structure located between an inlet and an outlet. The nanowire structure may include a plurality of vertically stacked horizontal nanowires.

13 Claims, 8 Drawing Sheets

(56) References Cited

U.S. PATENT DOCUMENTS

| | | | |
|---|---|---|---|
| 2004/0173506 A1 | 9/2004 | Doktycz et al. | |
| 2006/0159916 A1* | 7/2006 | Dubrow | B01J 20/28007 428/357 |
| 2006/0188774 A1* | 8/2006 | Niu | H01M 4/8846 429/409 |
| 2007/0090026 A1 | 4/2007 | Han et al. | |
| 2008/0224115 A1* | 9/2008 | Bakkers | B82Y 10/00 257/1 |
| 2008/0280776 A1* | 11/2008 | Bashir | G01N 27/127 506/9 |
| 2009/0130433 A1* | 5/2009 | Takada | B22F 1/0025 428/328 |
| 2010/0003516 A1* | 1/2010 | Majumdar | B82Y 10/00 428/368 |
| 2011/0112546 A1* | 5/2011 | Juan, Jr. | A61F 9/00781 606/108 |
| 2011/0223412 A1* | 9/2011 | Cornelius | B01J 19/0093 428/323 |
| 2012/0145650 A1* | 6/2012 | Anderson | B82Y 30/00 210/767 |
| 2012/0173506 A1* | 7/2012 | Wilansky | G06F 17/30011 707/709 |
| 2012/0241371 A1* | 9/2012 | Revanur | B01D 53/228 210/488 |
| 2013/0270180 A1* | 10/2013 | Zhang | B01D 67/0046 210/500.25 |
| 2014/0021138 A1* | 1/2014 | Osterhoudt | B01D 29/21 210/669 |
| 2014/0061139 A1* | 3/2014 | Anderson | B82Y 30/00 210/767 |
| 2014/0295171 A1* | 10/2014 | Hori | C30B 29/36 428/332 |
| 2015/0037517 A1* | 2/2015 | Buriak | B05D 1/005 427/600 |
| 2015/0214261 A1* | 7/2015 | Park | G02B 5/287 257/432 |

OTHER PUBLICATIONS

Fortuna, U.S. Appl. No. 12/966,370, USPTO Notice of Allowance and Fees Due, Aug. 22, 2013 6 pages.

* cited by examiner

| 70 |
|---|
| 80 |
| 70 |
| 80 |
| 70 |
| 80 |
| 70 |
| 80 |
| 70 |
| 80 |
| 100 |

FIG. 6

NANO-FILTER AND METHOD OF FORMING SAME, AND METHOD OF FILTRATION

CROSS-REFERENCE TO RELATED APPLICATIONS

This application is a divisional of co-pending U.S. patent application Ser. No. 12/966,370.

TECHNICAL FIELD

The disclosure relates generally to a nano-filter and a method of forming same, and a method of filtration, and more particularly, to a nano-filter having a plurality of vertically stacked horizontal nanowires.

BACKGROUND

In separation technology, separation and identification of small molecules from larger ones is often performed. Separation may be employed, for example, in biology and chemical analysis systems. Often filters of various types are used with the aforementioned systems to aid in separation or analysis of samples.

SUMMARY

An aspect of the present invention relates to a nano-filter comprising: a substrate; and at least one nanowire structure on the substrate located between an inlet and an outlet, wherein the nanowire structure comprises a plurality of vertically stacked horizontal nanowires.

A second aspect of the present invention relates to a method of forming a nano-filter, the method comprising: forming at least one nanowire structure having a plurality of vertically stacked horizontal nanowires on a substrate, the forming of the at least one nanowire structure comprising: forming a plurality of layers of a first material and a second material on the substrate; masking and etching through the plurality of layers of the first material and the second material; and removing the plurality of layers of the second material selective to the first material so as to form the at least one nanowire structure having the plurality of vertically stacked horizontal nanowires; and depositing a capping layer on the at least one nanostructure so as to form the nano-filter.

A third aspect of the present invention relates to a method of filtration, the method comprising: passing a material through a nano-filter comprising: a substrate; and at least one nanowire structure on the substrate located between an inlet and an outlet, wherein the nanowire structure comprises a plurality of vertically stacked horizontal nanowires; and collecting a filtrate.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIGS. 6-8 depict cross-sectional views of an embodiment of steps of a method of forming a nanowire structure, in accordance with the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

It has been discovered in biology analysis systems that detection of low concentration biomarkers may be limited due to the presence of larger biomolecules in a fluid sample. Pre-fractionation and separation of the fluid sample may eliminate the larger biomolecules to enhance the detection ability but none of the conventional separation techniques are appropriate for the task. Micro/nano fluidic molecular sieving structures fabricated with semiconductor technology have been used to separate biomolecules as well, though the systems have only been successfully used for large biomolecule separation, such as viral DNA.

It also has been discovered that in chemical analysis systems, such as mass spectrometry systems, most systems are too big to accommodate microelectromechanical systems (MEMS). Typically, an interface is needed to connect the two. Such interfaces lead to the mass spectrometry system developing disadvantages such as dead sample volume which can obviate the advantages gained in MEMS miniaturization and MEMS clogging.

Figure 1:
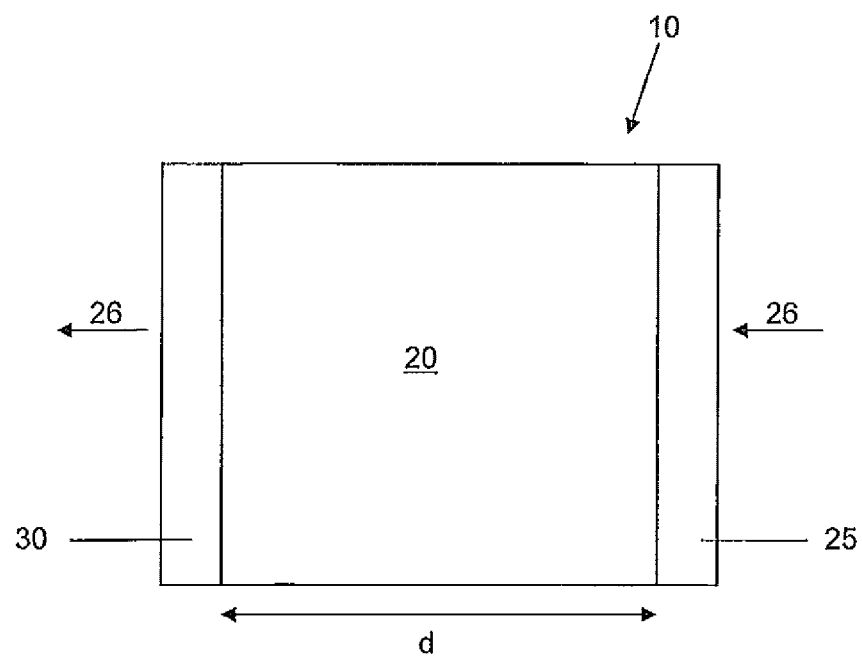
FIG. 1 depicts a top-down view of an embodiment of a nano-filter, in accordance with the present invention.

Referring to FIG. 1, a top-down view of an embodiment of a nano-filter 10 is shown. Nano-filter 10 comprises a nanowire structure 20, an inlet 25, and an outlet 30. Inlet 25 may be operatively attached to nanowire structure 20 such that inlet 25 may allow a material to flow into nanowire structure 20 wherein the material may be eventually filtered. Outlet 30 may also be operatively attached to nanowire structure 20 such that outlet 30 allows the filtered material to flow out of nanowire structure 20. In an embodiment, inlet 25 and outlet 30 may be respective openings of nanowire structure 20 and not separate elements. Methods of operatively attaching a separate inlet and outlet to a nano-filter as described herein are well known in the art. As shown in a cross-sectional view of FIG. 2, nano-filter 10 may additionally comprise a substrate 100 and a capping layer 60. Substrate 100 may be a base on which nano-filter 10 is supported. Capping layer 60 may be a top layer that covers nanowire structure 20 as well as inlet 25 and outlet 30. As shown in FIG. 1, nanowire structure 20 may have a depth d. Arrows 26 indicate the direction of flow through nano-filter 10 and in particular, nanowire structure 20.

Figure 2:
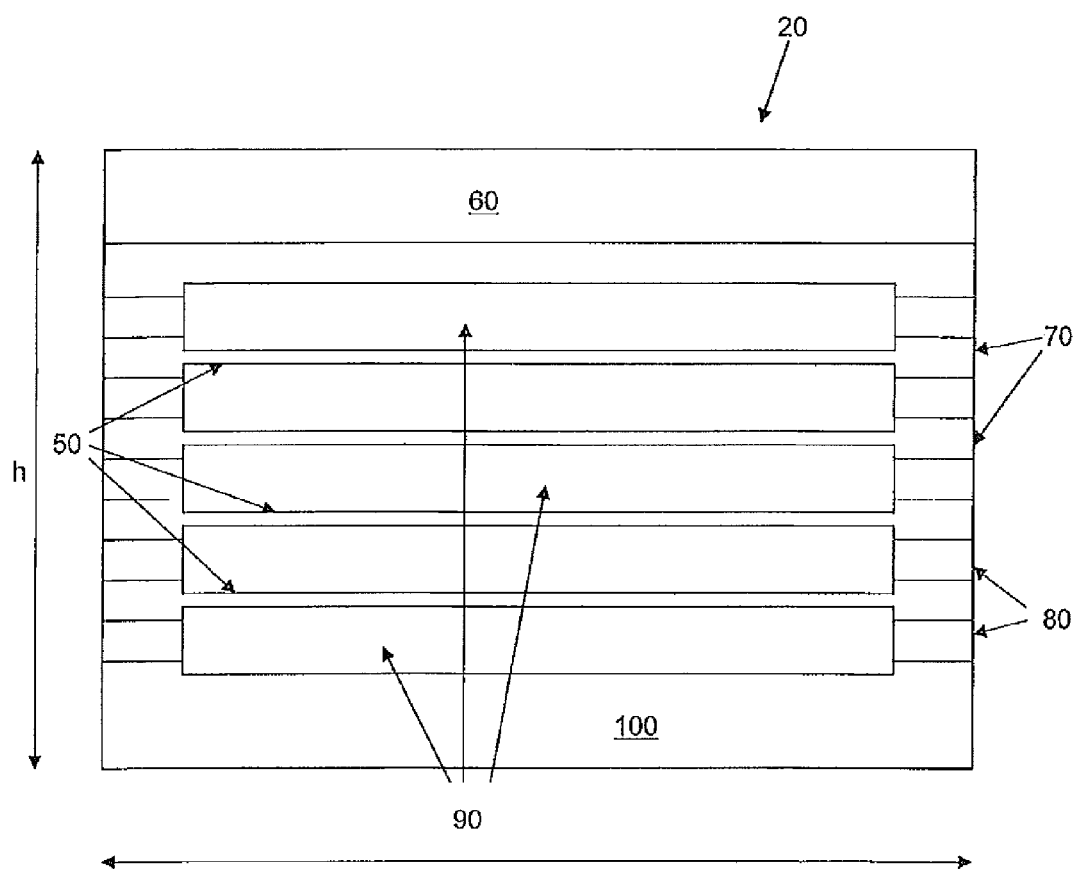
FIG. 2 depicts a cross-sectional view of an embodiment of a nanowire structure, in accordance with the present invention.

Referring to again to FIG. 2, nanowire structure 20 may comprise a plurality of vertically stacked horizontal nanowires 50, capping layer 60, silicon layers 70, silicon-germanium layers 80, openings 90, and substrate 100. The material for filtration enters openings 90 in the direction indicated by directional arrows 26 (see FIG. 1). The present discussion will focus on an embodiment wherein the nanowire structure is as shown in FIGS. 1 and 2. The discussion is also equally applicable to any embodiment of nanowire structures (21, 22, 40, 42, 44, and 46) described herein (see FIGS. 3 and 4).

Plurality of vertically stacked horizontal nanowires 50 may be substantially parallel to substrate 100 and may be substantially parallel to each other. Nanowires 50 may also be vertically stacked on top of each other with openings 90 in between that extend the entire depth d of nanowire structure 20 (see FIG. 1). In an embodiment, nanowires 50 may comprise silicon. In another embodiment, nanowires 50 may comprise the same material that layers 70 comprise. Nanowires 50 may be uniformly spaced, i.e., openings 90 may have similar widths. Alternatively, may be non-uniformly spaced openings 90, i.e., openings 90 may have different widths. Openings 90 may be located between nanowires 50, and any of silicon layer 70, and substrate 100. In an embodiment, openings 90 may also be located between nanowires 50 and capping layer 60. Openings 90 may comprise open space.

Capping layer 60 may be the top layer of nanostructure 20 and may cover plurality of vertically stacked horizontal nanowires 50. In an embodiment, capping layer 60 may also be the top layer of nano-filter 10 as well as the top layer of nanostructure 20 simultaneously. Capping layer 60 may include but is not limited to a material such as silicon or silicon nitride. Capping layer 60 and materials comprising them are known in the art.

Substrate 100 may be a base on which nano-filter 10 is supported. Substrate 100 may be integrally attached to nanowire structure 20, i.e., substrate 100 may be a non-discernible element of nanowire structure 20. Substrate 100 may also be non-integrally attached to nanostructure 20, i.e., substrate 100 may be a separate, discernible element of nanowire structure 20. In an embodiment, substrate 100 may be a semiconductor substrate such as but not limited to silicon, germanium, silicon germanium, silicon carbide, and those consisting essentially of one or more Group III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity).

Semiconductor substrate 100 may also comprise Group II-VI compound semiconductors having a composition $Zn_{A1}Cd_{A2}Se_{B1}Te_{B2}$, where A1, A2, B1, and B2 are relative proportions each greater than or equal to zero and A1+A2+B1+B2=1 (1 being a total mole quantity). The processes to provide semiconductor substrate 100 described herein are well known in the art. In an embodiment, semiconductor substrate 100 may comprise a p-type doped substrate. Examples of p-type dopants include but are not limited to boron (B), indium (In), and gallium (Ga). In another embodiment, semiconductor substrate 100 may comprise an n-type doped substrate. Examples of n-type dopants include but are not limited to phosphorous (P), arsenic (As), and antimony (Sb).

As shown in FIG. 2, the ratio of width w to height h of nanowire structure 20 may be in a range from approximately 3:1 to approximately 100:1. The ratio of width w to depth d (see FIG. 1) of nanowire structure 20 may be in a range from approximately 1:1 to approximately 100:1.

Figure 3:
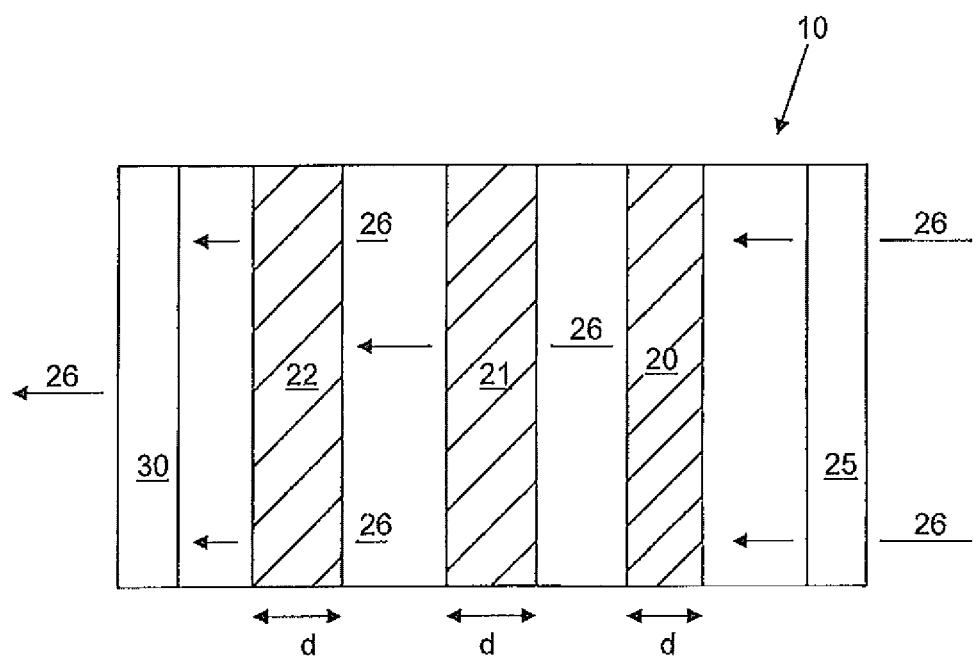
FIG. 3 depicts a top-down view of another embodiment of a nano-filter, in accordance with the present invention.

Referring to FIG. 3, a top-down view of another embodiment of a nano-filter is shown. Nano-filter 10 may comprise multiple nanowire structures 20, 21, and 22 described herein. The material for filtration, as indicated by directional arrows 26, may enter nano-filter 10 via inlet 25. The material may then continue to and through nanostructures 20, 21, and 22 for filtration and eventually exit nano-filter 10 via outlet 30. Nano-filter 10 may additionally comprise substrate 100 and capping layer 60 as shown in FIG. 2. Capping layer 60 may be a top layer that covers nano-filter 10 as well as nanowire structures 20, 21, and 22.

Figure 4:
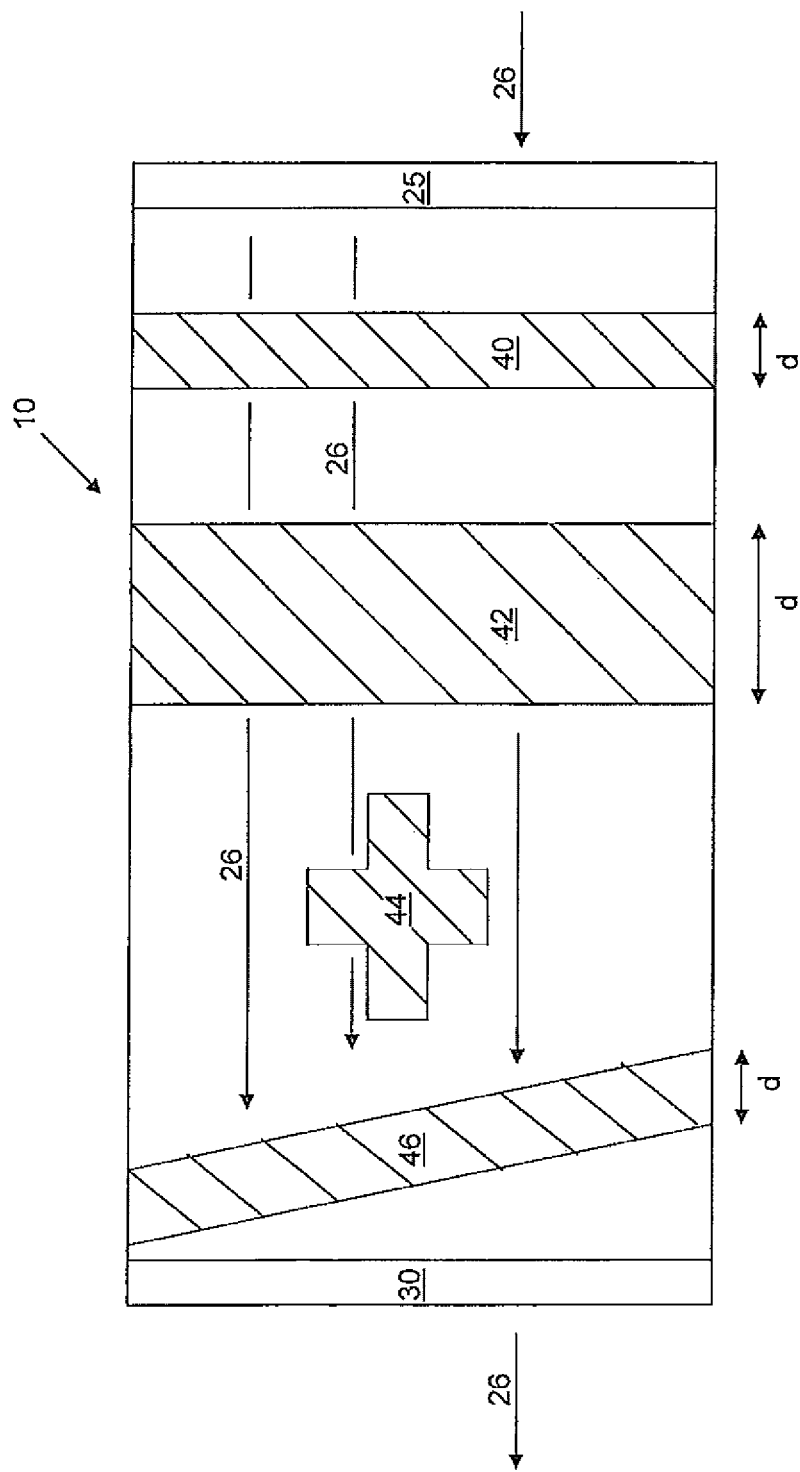
FIG. 4 depicts a top-down view of another embodiment of a nano-filter, in accordance with the present invention.
Figure 5:
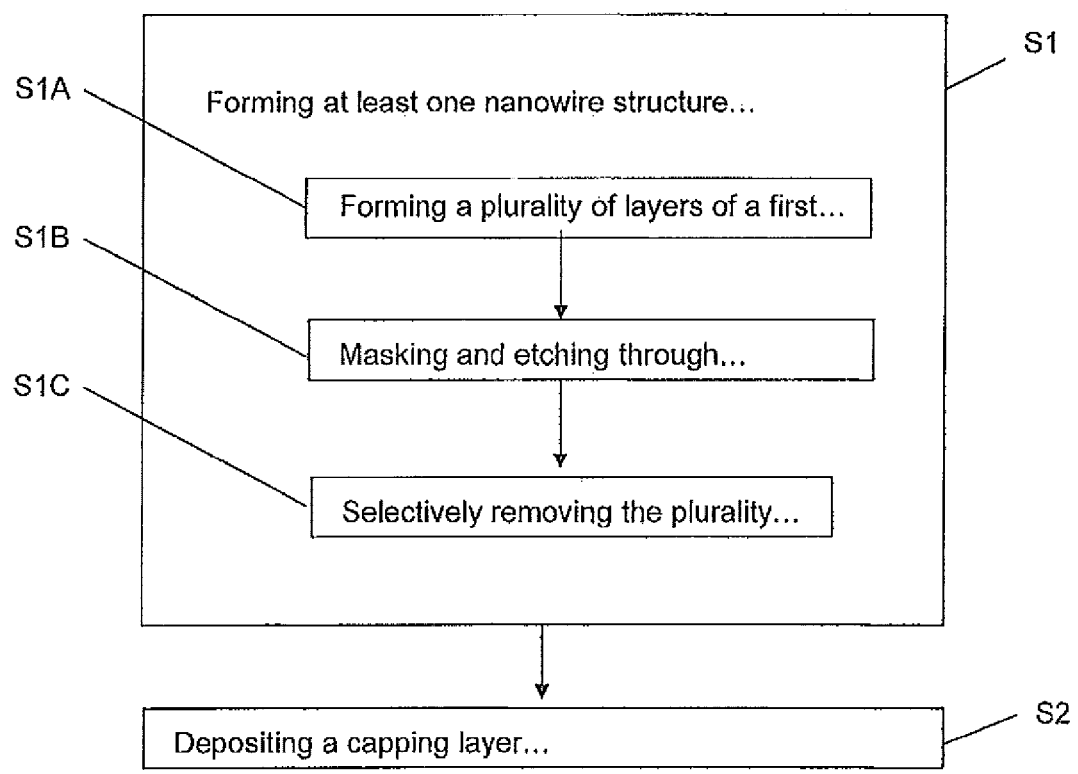
FIG. 5 depicts a flow diagram of an embodiment of a method of forming a nano-filter, in accordance with the present invention.

Referring to FIG. 4, a top-down view of another embodiment of a nano-filter is shown. Nano-filter 10 may comprise multiple nanowire structures 40, 42, 44, and 46 described herein. Nanowire structures 40, 42, 44, and 46 may have different depths d, and may be of various shapes and sizes. Nanowire structures 40, 42, 44, and 46 may independently comprise openings 90 (see FIG. 2) having different widths to filter different size materials.

Figure 6:
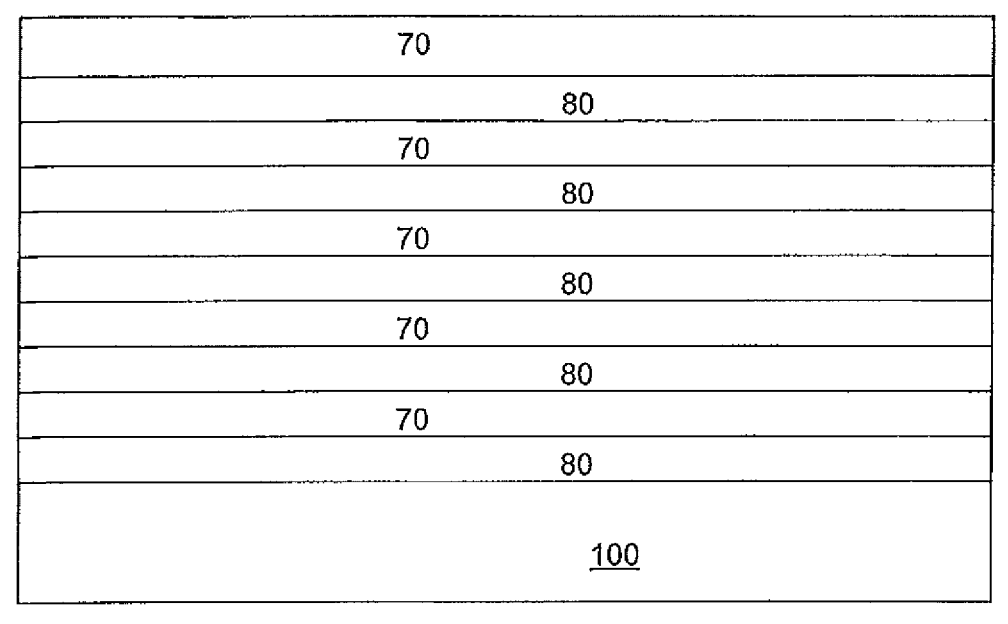

Referring to FIGS. 5-8, an embodiment of a method of forming a nano-filter 10 is presented. Step S1, forming at least one nanowire structure 20 on a substrate 100 comprises steps S1A to S1C. Step S1A, as shown in FIG. 6, may include forming a plurality of layers of a first material 70 and a second material 80 on substrate 100. In an embodiment, first material 70 may comprise silicon and second material 80 may comprise silicon-germanium. Embodiments of substrate 100 have been previously described herein. In an embodiment, substrate 100 may be silicon.

Plurality of layers of first material 70 and second material 80 may be deposited on semiconductor substrate 100 using known techniques in the art. In an embodiment, plurality of layers of first material 70 and second material 80 may be alternating. The thickness of second material layers 80 may be in a range from approximately 2 nm to approximately 10 microns and all subranges therebetween. Plurality of layers of first material 70 and second material 80 deposited may number from approximately 2 to approximately 100.

Examples of deposition techniques may include but are not limited to: chemical vapor deposition (CVD), low-pressure CVD (LPCVD), plasma-enhanced CVD (PECVD), semi-atmosphere CVD (SACVD) and high density plasma CVD (HDPCVD), rapid thermal CVD (RTCVD), ultra-high vacuum CVD (UHVCVD), limited reaction processing CVD (LRPCVD), metal organic CVD (MOCVD), sputtering deposition, ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating, and evaporation. Any later developed techniques appropriate for the deposition of plurality of layers of first material 70 and second material 80 on substrate 100 may also be used.

Figure 7:
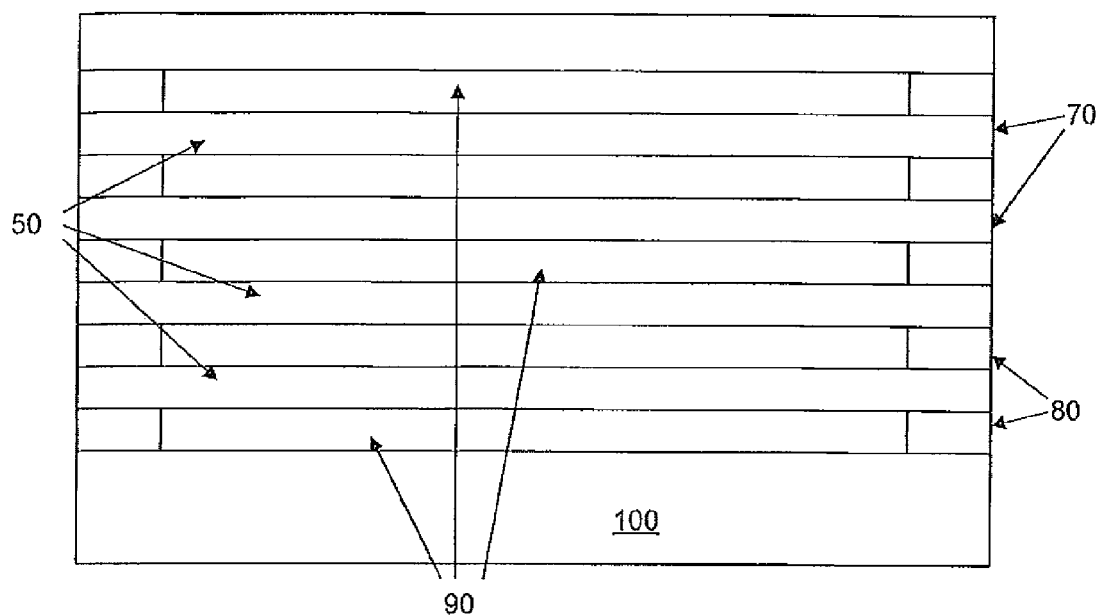

Step S1B, as shown in FIG. 7, may include masking and etching through plurality of layers of first material 70 and second material 80 to form openings 90. Masking and etching may be performed using any known techniques in the art or later developed techniques appropriate for masking and etching layers of first material 70 and second material 80, and in particular, when first material 70 may comprise silicon and second material 80 may comprise silicon-germanium. For example, an anisotropic reactive ion etch (RIE), e.g., fluorine-based etch, may be used to etch vertically through selected regions of the first material 70 and material 80 layers.

Figure 8:
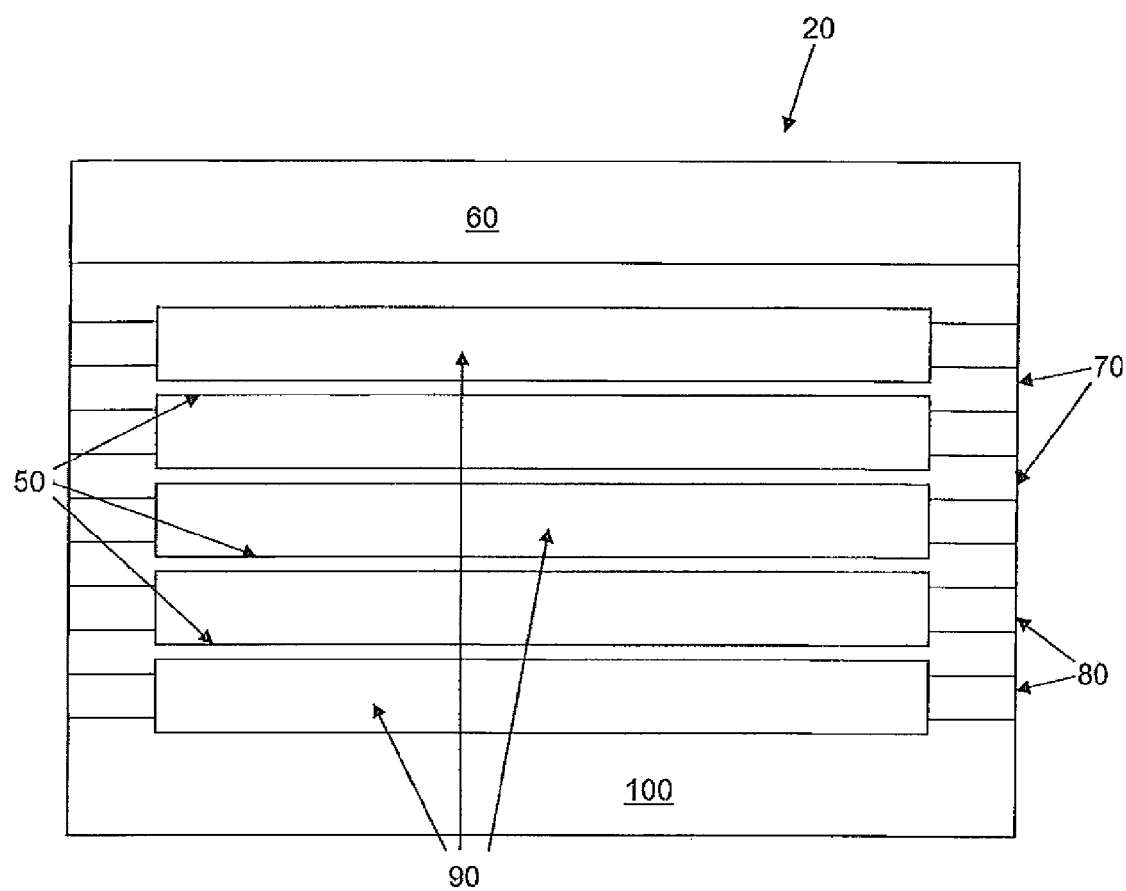

As shown in FIG. 8, step S1C includes selectively removing a plurality of second material layers 80 to form a plurality of vertically stacked horizontal nanowires 50. Techniques for selectively removing second material layers 80, and in particular, silicon-germanium layers, are known in the art. In one embodiment, the removing may be performed by an isotropic, selective etch of the exposed second material 80 layers of step S1B. The selective etch may comprise oxidation at approximately 700° to approximately 900° C., which is known to oxidize, for example, silicon-germanium layers at a much more rapid rate than, for example, silicon layers. A dilute hydrogen fluoride (DHF) wet etch may then be performed to remove the oxidized regions resulting in the formation of horizontal nanowires 50. Step S1C may further comprise etching plurality of vertically stacked horizontal nanowires 50 again and as previously described so as to reduce their thickness and increase the width of openings 90. Plurality of vertically stacked horizontal nanowires 50 may number in a range from approximately 2 to approximately 100. Nanowires 50 may have a thickness in a range from approximately 2 nm to 500 nm and subranges therein. Nanowires 50 may also have a thickness of 2 nm to 50 nm and subranges therein. Openings 90 may have a width in a range from approximately 5 nm to 15 microns. In another embodiment, openings 90 may have a width of approximately 10 nm to approximately 100 nm.

The width of openings 90 may be accurately controlled by masking and further etching of nanowires 50; masking, oxidizing, and stripping of nanowires 50; and/or varying etch rates, all of which are known in the art. In an embodiment, the etch rate may be varied by changing the implant angle when first material layers 70 and/or second material layers 80 are formed on substrate 100. Step S1C may further comprise modifying plurality of vertically stacked horizontal nanowires 50 by oxidation, silicidation, metallization, and the like. Metals for use in the metallization treatment may include but are not limited to aluminum, nickel, copper, titanium, tantalum, platinum, and tungsten.

Returning to FIG. 5, step S2, depositing capping layer 60 on the at least one nanostructure 20 so as to form nano-filter 10 may be performed using any known techniques in the art or later developed techniques appropriate for depositing a capping layer. After formation, nanowire structure 20 may be operatively integrated with complementary metal oxide semiconductor (CMOS) logic on a chip. Nanowire structure 20 may be integrated with CMOS logic such that the CMOS log is planar with the top surface of nano-filter 10. Methods for integrating CMOS logic with nanostructures are known in the art.

An embodiment of a method of filtration is presented. Referring to FIGS. 1 and 2, a nano-filter 10 may be provided for filtration. Various embodiments of nano-filter 10 have been previously described herein. The present discussion will focus on nano-filter 10 having nanowire structure 20 as is shown in FIGS. 1 and 2 but is applicable to nano-filter 10 having any of nanowire structures 21, 22, 42, 44, or 46 (see FIGS. 3 and 4). A flow of material for filtration may be established with nano-filter 10 via an inlet 25. Inlet 25 may be coupled to various devices and systems that provide a flow of material for filtration, for example, a microelectromechanical system (MEMS). Examples of MEMS include but are not limited to a molecular sorter and a biological sorter. The material for filtration may include but is not limited to biomolecules, blood, DNA, proteins, drinking water, and the like. Techniques for coupling inlet 25 to MEMS are known in the art.

Material, for example biomolecules, may flow into nano-filter 10 via inlet 25. The biomolecules may continue to flow and enter nanowire structure 20 via openings 90, and pass between plurality of vertically stacked horizontal nano-wires 50. Biomolecules larger than openings 90 may not pass through nanowire structure 20 being that the biomolecules are larger than openings 90. Biomolecules smaller than openings 90 may pass through nanowire structure 20 resulting in the material being filtered and a filtrate exiting nano-filter 10 via outlet 30. The filtrate may be collected or transferred to another system via outlet 30. Outlet 30 may be coupled to a non-MEMS. Examples of non-MEMS include but are not limited to a mass spectrometer, a gel electrophoresis apparatus, a capillary electrophoresis apparatus, a genetic sequencer, a nuclear magnetic resonance instrument, and etc. Methods of coupling an outlet 30 to a non-MEMS described herein is well known in the art.

Another embodiment of a method of filtration is presented. Referring to FIGS. 2 and 3, a nano-filter 10 having multiple nanowire structures 20, 21, and 22 may be provided for filtration. A flow of material, as shown by directional arrows 26, for filtration may be established with nano-filter 10 via an inlet 25. As described herein, material, for example biomolecules, may flow into nano-filter 10 via inlet 25, and may continue to flow to be filtered by nanowire structure 22 based on the size difference of openings 90 and the biomolecules to be filtered.

The nanowire structures 20-22 may have graduated openings 90. Biomolecules smaller than openings 90 may pass through nanowire structure 20 and may continue to nanowire structure 21. Nanowire structure 21 may have openings smaller than openings 90 of nanostructure 20 and the biomolecules that passed through nanowire structure 20 may be further filtered by nanowire structure 21. Biomolecules that pass through nanowire structure 21 may also continue for further filtration by nanowire structure 22 having openings that differ from those of nanowire structures 20 and 21. Embodiments of nano-filter 10 of the present invention having multiple nanowire structures may provide multiple filtrations of a material passing therethrough by varying the widths of the openings of the multiple nanowire structures.

Not being held to any particular theory, the filtration of the material may occur due to size exclusion, i.e., the molecules to be filtered are larger then openings 90. Filtration may also occur via chemical sensing, i.e., nanostructures 20, 21, and 22 may independently have an applied electrical field in which plurality of nanowires 50 are electrically active and can be switched. Chemical sensing is known in the art.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A nano-filter comprising:
   a substrate; and
   at least one nanowire structure on the substrate located between an inlet and an outlet, wherein the nanowire structure comprises a plurality of vertically stacked horizontal nanowires and at least one opening between an adjacent pair of the plurality of vertically stacked horizontal nanowires,
   wherein the plurality of vertically stacked horizontal nanowires are modified by a treatment selected from one of metallization, oxidation, and silicidation.

2. The nano-filter according to claim 1, wherein the plurality of vertically stacked horizontal nanowires comprise silicon.

3. The nano-filter according to claim 1, wherein the plurality of vertically stacked horizontal nanowires number in a range from approximately 2 to approximately 100.

4. The nano-filter according to claim 1, wherein the plurality of vertically stacked horizontal nanowires have a thickness in a range from approximately 2 nm to approximately 500 nm.

5. The nano-filter according to claim 4, wherein each nanowire of the plurality of vertically stacked horizontal nanowires independently has a thickness in a range from approximately 2 nm to approximately 50 nm.

6. The nano-filter according to claim 1, wherein the plurality of vertically stacked horizontal nanowires are metalized with metals selected from one of aluminum, nickel, copper, titanium, tantalum, platinum, and tungsten.

7. The nano-filter according to claim 1, wherein the nanowire structure includes integration with a complementary metal oxide semiconductor logic.

8. The nano-filter according to claim 1, wherein the nanowire structure comprises a width to height ratio of approximately 3:1 to approximately 100:1.

9. The nano-filter according to claim 1, wherein the nanowire structure comprises a width to depth ratio of approximately 1:1 to approximately 100:1.

10. The nano-filter according to claim 1, wherein the plurality of vertically stacked horizontal nanowires are non-uniformly spaced.

11. A method of filtration, the method comprising:
passing a material through a nano-filter comprising:
a substrate; and
at least one nanowire structure on the substrate located between an inlet and an outlet, wherein the nanowire structure comprises a plurality of vertically stacked horizontal nanowires and at least one opening between an adjacent pair of the plurality of vertically stacked horizontal nanowires, wherein the plurality of vertically stacked horizontal nanowires are modified by a treatment selected from one of metallization, oxidation, and silicidation;
and
collecting a filtrate.

12. The method for filtration according to claim 11, wherein the plurality of vertically stacked horizontal nanowires have a thickness in a range from approximately 2 nm to approximately 500 nm.

13. The method according to claim 11, wherein the material is selected from one of biomolecules, blood, and drinking water.

* * * * *